United States Patent
Baba et al.

(10) Patent No.: US 7,289,255 B2
(45) Date of Patent: Oct. 30, 2007

(54) HOLOGRAM APPARATUS, POSITIONING METHOD FOR SPATIAL LIGHT MODULATOR AND IMAGE PICKUP DEVICE, AND HOLOGRAM RECORDING MATERIAL

(75) Inventors: Shigeyuki Baba, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 11/190,012

(22) Filed: Jul. 27, 2005

(65) Prior Publication Data

US 2006/0039051 A1    Feb. 23, 2006

(30) Foreign Application Priority Data

Jul. 28, 2004 (JP) ............................ 2004-219578
Jan. 21, 2005 (JP) ............................ 2005-014513

(51) Int. Cl.
*G03H 1/04* (2006.01)
(52) U.S. Cl. ............................ 359/35; 359/30; 359/32
(58) Field of Classification Search ................ 359/35, 359/32, 30
See application file for complete search history.

(56) References Cited

U.S. PATENT DOCUMENTS

2002/0172131 A1* 11/2002 Burr ........................ 369/103
2005/0286095 A1* 12/2005 Yoon ........................ 358/483
2006/0050544 A1* 3/2006 Horimai ........................ 365/6
2007/0065019 A1* 3/2007 Yasuda et al. .............. 382/232

* cited by examiner

Primary Examiner—Fayez G. Assaf
(74) Attorney, Agent, or Firm—Oblon, Spivak, McClelland, Maier & Neustadt, P.C.

(57) ABSTRACT

The present invention provides a hologram apparatus for recording interference fringes formed from reference light and signal light optically spatially modulated by a spatial light modulator on a hologram recording material or picking up an image of reproduction signal light produced by irradiating illumination reproduction light on the hologram recording material by means of an image pickup device to obtain a reproduction image signal. The hologram apparatus includes a matching data acquisition section, an arithmetic operation section, and a positioning control section. The matching data acquisition section directly picks up an image of the signal light optically spatially modulated with a pixel matching pattern displayed on the spatial light modulator by means of the image pickup device to obtain a reproduction image signal. The arithmetic operation section performs predetermined arithmetic operation using a luminance value of the reproduction image signal. The positioning control section moves a relative position between the image pickup device and the spatial light modulator in response to a result of the arithmetic operation of the arithmetic operation section.

21 Claims, 10 Drawing Sheets

HOLOGRAM APPARATUS, POSITIONING METHOD FOR SPATIAL LIGHT MODULATOR AND IMAGE PICKUP DEVICE, AND HOLOGRAM RECORDING MATERIAL

BACKGROUND OF THE INVENTION

This invention relates to a hologram apparatus for recording and reproducing data into and from a holographic memory, and more particularly to a positioning method for a spatial light modulator and an image pickup device for positioning the spatial light modulator and the image sensor on the pixel level.

In recent years, holographic techniques have been and are being developed rapidly in order to achieve practical use of holographic memories to which attention is paid as a strong storage candidate competent with next-generation and next-next-generation optical disks. A hologram recording and reproduction system, which makes use of a hologram technique to perform recording and reproduction of a large amount of data is disclosed, for example, in "Holographic data storage", IBM J. RES DEVELOP, Vol. 44, No. 3, May, 2000.

According to the hologram storage recording and reproduction system (hologram apparatus), a coherent laser beam is split into signal light and reference light, and the signal light is intensity modulated with recording data by a spatial light modulator (SLM). The modulated signal light is condensed on a hologram recording medium (hologram recording material). Thereupon, since also the reference light is irradiated on the hologram recording medium, the signal light and the reference light interfere with each other, and interference fringes formed by the interference are recorded as fine density patterns in the recording medium.

In order to reproduce the data recorded in the hologram recording medium, illumination reproduction light same as the reference light is introduced at an angle equal to that of the reference light to the hologram recording medium. Thereupon, the data are reproduced as diffraction light (reproduction signal light) corresponding to the interference fringes recorded in the hologram recording medium. The reproduction signal light is condensed on an image sensor such as a CCD+CMOS image sensor and retrieved as bit patterns into an image pickup device. The received light signal obtained by the image pickup device is analyzed and reproduced as data.

SUMMARY OF THE INVENTION

However, according to the hologram storage in related art, if data reproduction is performed without particularly performing positioning between the spatial light modulator and the image sensor or positioning between a hologram reproduction image and the image sensor, then an image of one pixel of the spatial light modulator may not necessarily be formed on one pixel of the image sensor. Therefore, under certain circumstances, reproduction signal light is received by a portion of the image sensor between adjacent pixels, and the amount of light that can be received by the pixels decreases. Hologram reproduction usually exhibits a poor S/N ratio, and in reproduction of a hologram of two values, a high contrast between the 0 level and the 1 level cannot be taken. Therefore, decrease of the received light amount by the image sensor has a significant influence on the bit error rate (BER).

It is desirable to provide a hologram apparatus and a positioning method for a spatial light modulator and an image pickup device by which positional displacement between a spatial light modulator and an image sensor on the pixel level can be corrected automatically and a hologram recording material on which data for automatically correcting such positional displacement are recorded.

According to an embodiment of the present invention, there is provided a hologram apparatus for recording interference fringes formed from reference light and signal light optically spatially modulated by a spatial light modulator on a hologram recording material or picking up an image of reproduction signal light produced by irradiating illumination reproduction light on the hologram recording material by means of an image pickup device to obtain a reproduction image signal. The hologram apparatus includes a matching data acquisition section for directly picking up an image of the signal light optically spatially modulated with a pixel matching pattern displayed on the spatial light modulator by means of the image pickup device to obtain a reproduction image signal, an arithmetic operation section for performing predetermined arithmetic operation using a luminance value of the reproduction image signal, and a positioning control section for moving a relative position between the image pickup device and the spatial light modulator in response to a result of the arithmetic operation of the arithmetic operation section.

According to another embodiment of the present invention, there is provided a positioning method for a spatial light modulator and an image pickup device in a hologram apparatus. The positioning method includes the steps of displaying a pixel matching pattern on the spatial light modulator, directly picking up an image of the signal light optically spatially modulated with the pixel matching pattern displayed on the spatial light modulator by means of the image pickup device to obtain a reproduction image signal, performing predetermined arithmetic operation using a luminance value of the reproduction image signal, and moving a relative position between the image pickup device and the spatial light modulator in response to a result of the arithmetic operation.

According to a further embodiment of the present invention, there is provided a hologram apparatus for picking up an image of reproduction signal light reproduced by irradiating illumination reproduction light on a hologram recording material by means of an image pickup device to obtain a reproduction image signal. The hologram apparatus includes a matching data acquisition section for picking up an image of reproduction signal light obtained by reproduction of a pixel matching pattern recorded in advance in the hologram recording medium by means of the image pickup device to obtain a reproduction image signal, an arithmetic operation section for performing predetermined arithmetic operation using a luminance value of the reproduction image signal, and a positioning control section for moving a relative position between the image pickup device and the spatial light modulator in response to a result of the arithmetic operation of the arithmetic operation section.

According to a still further embodiment of the present invention, there is provided a positioning method for a spatial light modulator and an image pickup device in a hologram apparatus. The positioning method includes the steps of reproducing a pixel matching pattern recorded in advance in the hologram recording material to obtain reproduction signal light, picking up an image of the reproduction signal light by means of the image pickup device to obtain a reproduction image signal, performing predetermined arithmetic operation using a luminance value of the reproduction image signal, and moving a relative position between the image pickup device and the spatial light modulator in response to a result of the arithmetic operation.

In the hologram apparatus and the positioning methods for a spatial light modulator and an image pickup device, an image of a pixel matching pattern is picked up by means of an image pickup device having a resolution higher than that of a spatial light modulator, and a luminance signal of the resulting image signal is used to perform predetermined arithmetic operation to determine an evaluation value. Then, the position of the image pickup device with respect to the spatial light modulator is moved so that the evaluation value may have a maximum value thereby to automatically correct positional displacement between the spatial light modulator and the image pickup device on the pixel level. In particular, where the resolution of the image pickup device is as high as, for example, twice that of the spatial light modulator, when the image signal is oversampled, if the positions of the spatial light modulator and the image pickup device do not coincide with each other on the pixel level, then the received light amount of the image pickup device decreases. Making use of this fact, the decrease of the received light amount is evaluated using an evaluation function, and the position at which the sum total of such evaluation values exhibits a maximum value is considered as a position at which the spatial light modulator and the image pickup device coincide with each other on the pixel level. It is to be noted that a similar positioning operation can be performed also where a pixel matching pattern recorded in advance in a hologram material is used as the pixel matching pattern described above.

With the hologram apparatus and the positioning methods for a spatial light modulator and an image pickup device, by picking up a pixel matching pattern by means of an image pickup device having a resolution higher than that of a spatial light modulator, performing predetermined arithmetic operation using a luminance signal of the resulting image signal and moving the position of the image pickup device with respect to the spatial light modulator so that a result of the arithmetic operation may have a maximum value, any positional displacement between the spatial light modulator and the image pickup device can be corrected automatically. Consequently, the received light level of the image pickup device can be raised to reproduce an image having a low bit error rate and having a good quality.

BRIEF DESCRIPTION OF THE DRAWINGS

These and other objects of the invention will be seen by reference to the description, taken in connection with the accompanying drawings, in which.

DETAILED DESCRIPTION OF THE PREFERRED EMBODIMENT

Figure 1:
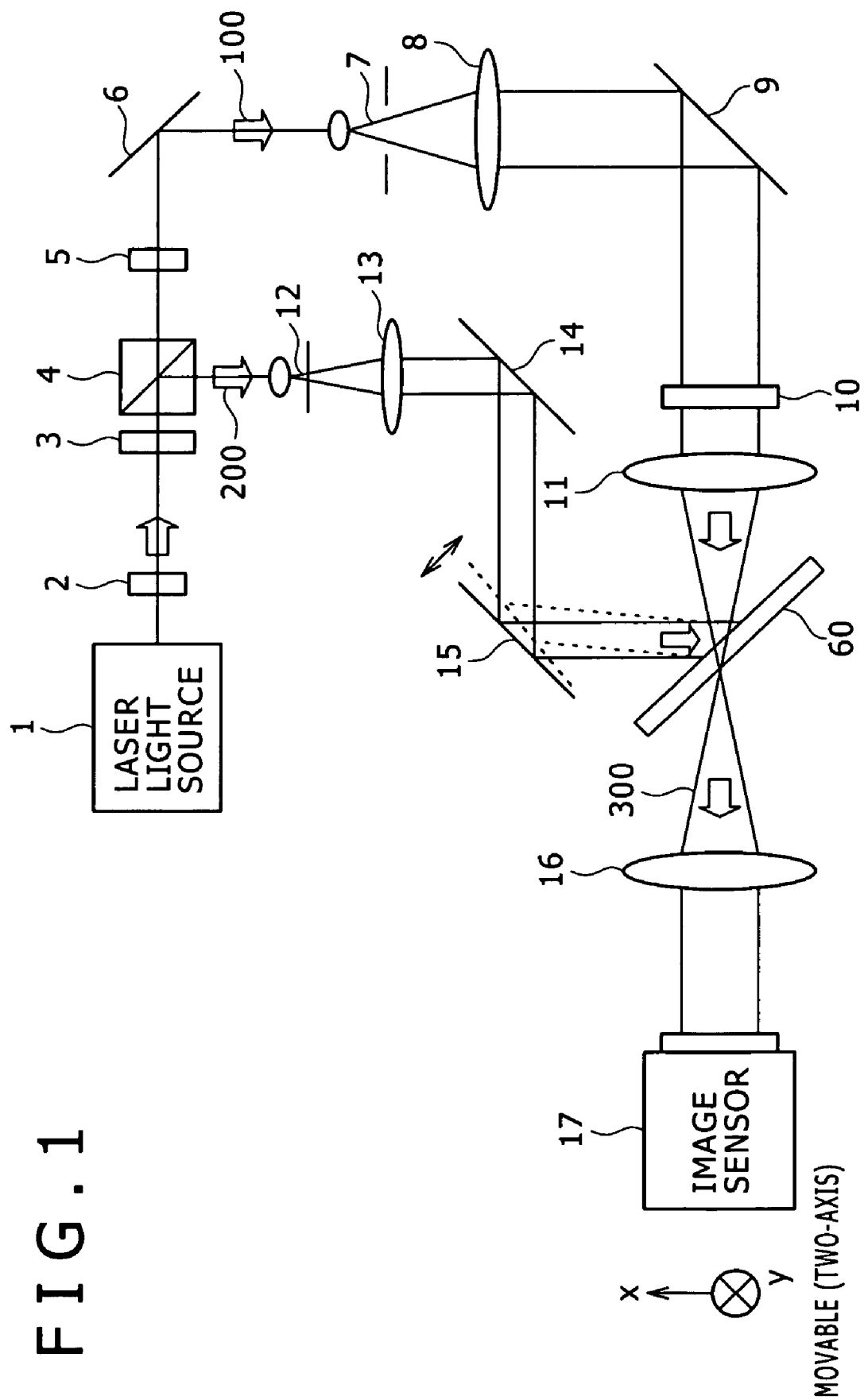
FIG. 1 is a block diagram showing a configuration of a hologram apparatus according to an embodiment of the present invention.

Referring first to FIG. 1, there is shown a configuration of a hologram apparatus in the form of a hologram recording and reproduction apparatus to which the present invention is applied. The hologram recording and reproduction apparatus includes a laser light source 1 such as a semiconductor layer, a shutter 2, a half-wave plate 3, a phase beam splitter (PBS) 4, another shutter 5, a mirror 6, a spatial filter 7, a collimate lens 8, another mirror 9, a spatial light modulator (SLM) 10, and a Fourier lens 11. The hologram recording and reproduction apparatus further includes another spatial filter 12, another collimate lens 13, a further mirror 14, a rotating mirror 15, another Fourier lens 16, an image sensor (image pickup device) 17, and a removable hologram recording material 60.

Now, operation of the hologram recording and reproduction apparatus of the present embodiment is described. Upon recording, the shutters 2 and 5 are open, and a laser beam emitted from the laser light source 1 is introduced to the phase beam splitter 4 through the half-wave plate 3. The phase beam splitter 4 splits the incoming laser beam into signal light 100 and reference light 200. The signal light 100 is diverted by the mirror 6 and passes through the spatial filter 7, whereafter it is converted into substantially parallel light by the collimate lens 8. The signal light 100 in the form of substantially parallel light is diverted by the mirror 9 and optically spatially modulated with a data page displayed on the spatial light modulator 10, whereafter it is condensed on the hologram recording material 60 (which is sometimes referred to merely as recording material) by the Fourier lens 11.

Meanwhile, the reference light 200 passes through the spatial filter 12 and is converted into substantially parallel light by the collimate lens 13, whereafter it is diverted by the mirror 14 and comes to the rotating mirror 15. The reference light 200 is diverted by an angle determined from a rotational angle of the rotating mirror 15 and then comes to the hologram recording material 60. Thereupon, if the rotational angle of the rotating mirror 15 changes, then the incoming angle of the reference light 200 to the hologram recording material 60 changes. Consequently, interference fringes by the signal light 100 and the reference light 200 are recorded in an angle multiplexing method in the hologram recording material 60.

Upon reproduction, the shutter 2 is open while the shutter 5 is closed. Consequently, the reference light 200 is irradiated as reproduction illumination light on the hologram recording material 60, and reproduction signal light 300 is generated by the hologram recording material 60. The reproduction signal light 300 is converted into substantially parallel light by the Fourier lens 16 and received by the image sensor 17. The image sensor 17 photoelectrically converts the received optical image into a reproduction image signal.

Figures 2, 3:
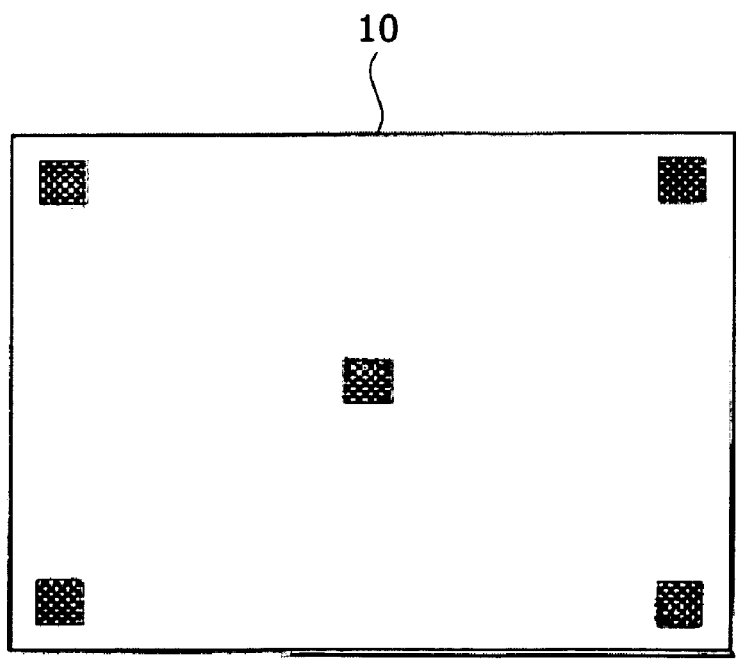
FIG. 2 is a schematic view showing an example of a matching pattern displayed on a spatial light modulator shown in FIG. 1.
FIG. 3 is a schematic view showing an example of arrangement of matching patterns displayed on the spatial light modulator shown in FIG. 1.

The hologram recording and reproduction apparatus of the present embodiment has a function of automatically correcting a positional displacement between the spatial light modulator 10 (hologram reproduction image) and the image sensor 17 on the pixel level. The function is described below. In a basic idea of automatic correction, for example, a marker for calibration formed from an alternate pattern of white and black (for example, as pixel values on the spatial light modulator 10, 255 and 0) as seen in FIG. 2 is considered. It is to be noted that the marker shown in FIG. 2 is a mere example, and any marker may be used only if it is formed from an alternate pattern.

A plurality of images on each of which the marker is disposed are displayed at scattered places on the spatial light modulator 10 as shown in FIG. 3, and an image of signal light spatially optically modulated by the spatial light modulator 10 is picked up directly by the image sensor 17 (in this instance, the hologram recording material 60 is removed). Then, positioning (hereinafter referred to as pixel matching) on the pixel level is performed between the spatial light modulator 10 (hologram image) and the image sensor 17 based on the resulting picked up image. It is to be noted that, where the compatibility (removability) between different drives is take into consideration, it is realistic to record such a calibration image (pixel matching pattern) as described above in the hologram recording material 60.

Figure 4B:
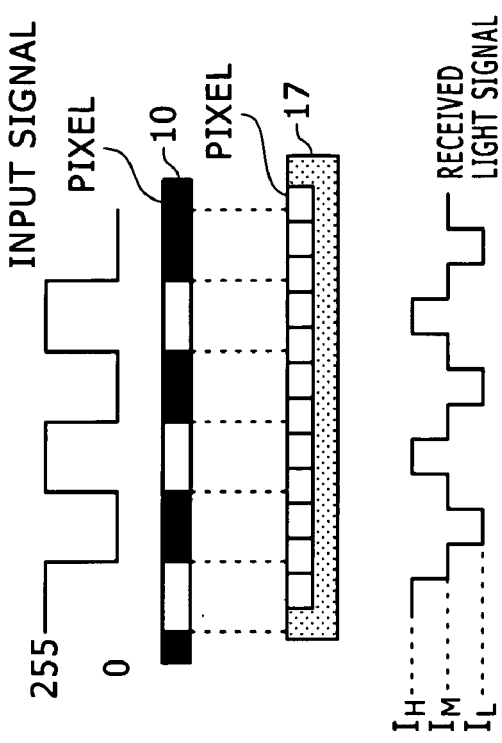
FIGS. 4A and 4B are waveform diagrams illustrating a principle of positioning between the spatial light modulator and an image sensor shown in FIG. 1.
Figure 4A:
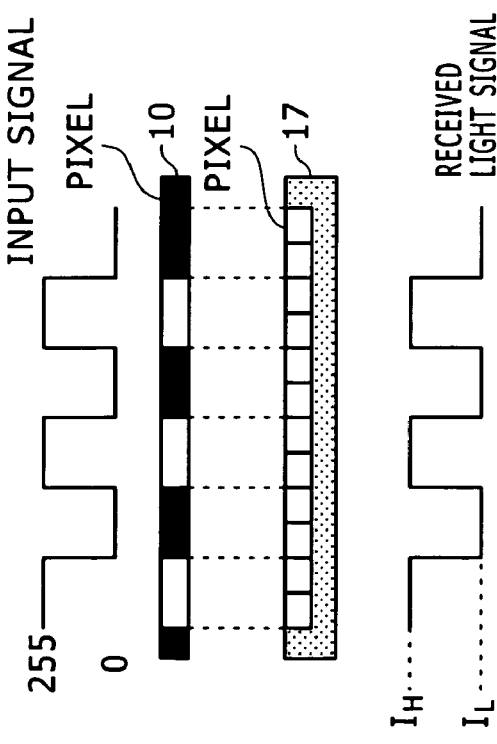

FIGS. 4A and 4B illustrate a manner of positioning between the spatial light modulator 10 and the image sensor 17. The image sensor 17 has a resolution as high as twice that of the spatial light modulator 10 such that the image sensor 17 receives light emitted from the spatial light modulator 10 in an oversampling manner. At this time, if the positioning is performed correctly as seen in FIG. 4A, then also an image of the calibration pattern whose image is picked up by the image sensor 17 is ideally picked up with a substantially fixed luminance value IH corresponding to 255 and with a substantially fixed luminance value IL corresponding to 0 similarly to the pattern display on the spatial light modulator 10. Thus, the received light signal of the image sensor 17 exhibits a simple rectangular waveform.

However, if the positioning is not performed correctly as seen in FIG. 4B, then some pixel on the image sensor 17 receives a reduced amount of light and therefore exhibits a luminance of an intermediate value IM between pixel values corresponding to 0 and 255 of the spatial light modulator 10. Therefore, the received light signal of the image sensor 17 exhibits a stepped rectangular waveform and assumes three values of the luminance value IH, intermediate value IM, and luminance value IL.

Figure 5:
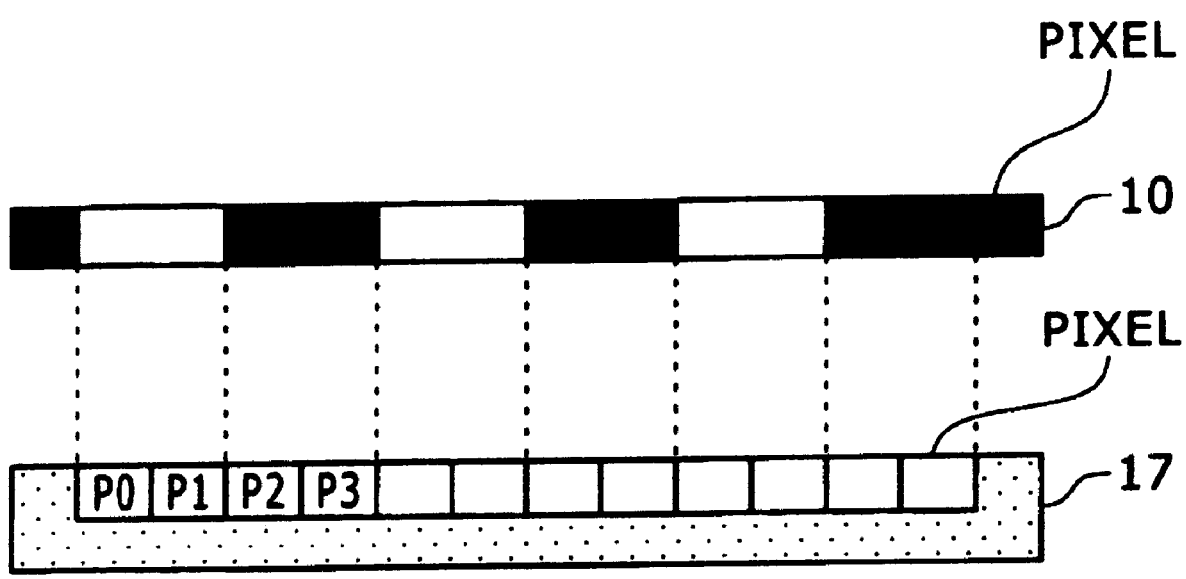
FIG. 5 is a schematic view illustrating an example of a luminance signal generated by successive pixels of the image sensor shown in FIG. 1.

Thus, this fact is utilized in the following manner. In particular, where received light values of successive pixels of the image sensor 17 are represented by $P_0$, $P_1$, $P_2$ and $P_3$ as seen in FIG. 5, the sum of squares of differences between neighboring pixel values represented by $\{(P_0+P_1)-(P_2+P_3)\}^2$ is determined as an evaluation function (since the received light values are obtained by the oversampling, differences between the sums of adjacent pixels). Then, positioning between the spatial light modulator 10 and the image sensor 17 on the pixel level can be performed using the evaluation function to search out the position at which the sum total of the differences. The evaluation function can be represented, by generalization, by the following expression:

$$\sum_k \{(P_{4k} + P_{4k+1}) - (P_{4k+2} + P_{4k+3})\}^2$$

It is to be noted that, where such an evaluation function as described is incorporated, if the speed of calculation takes precedence, a form of the expression above which does not involve squaring, that is, an expression of $(P_0+P_1)-(P_2+P_3)$ which is a difference between received light values of successive pixels, may be used. Thus, the generalized form represents the sum total of differences between received light values of successive pixels. Further, image pickup is preferably performed by a plural number of times in order to suppress an influence of random noise and so forth of the image sensor 17 such that a sum mean image is produced from the plural images and used for positioning.

Figure 6:
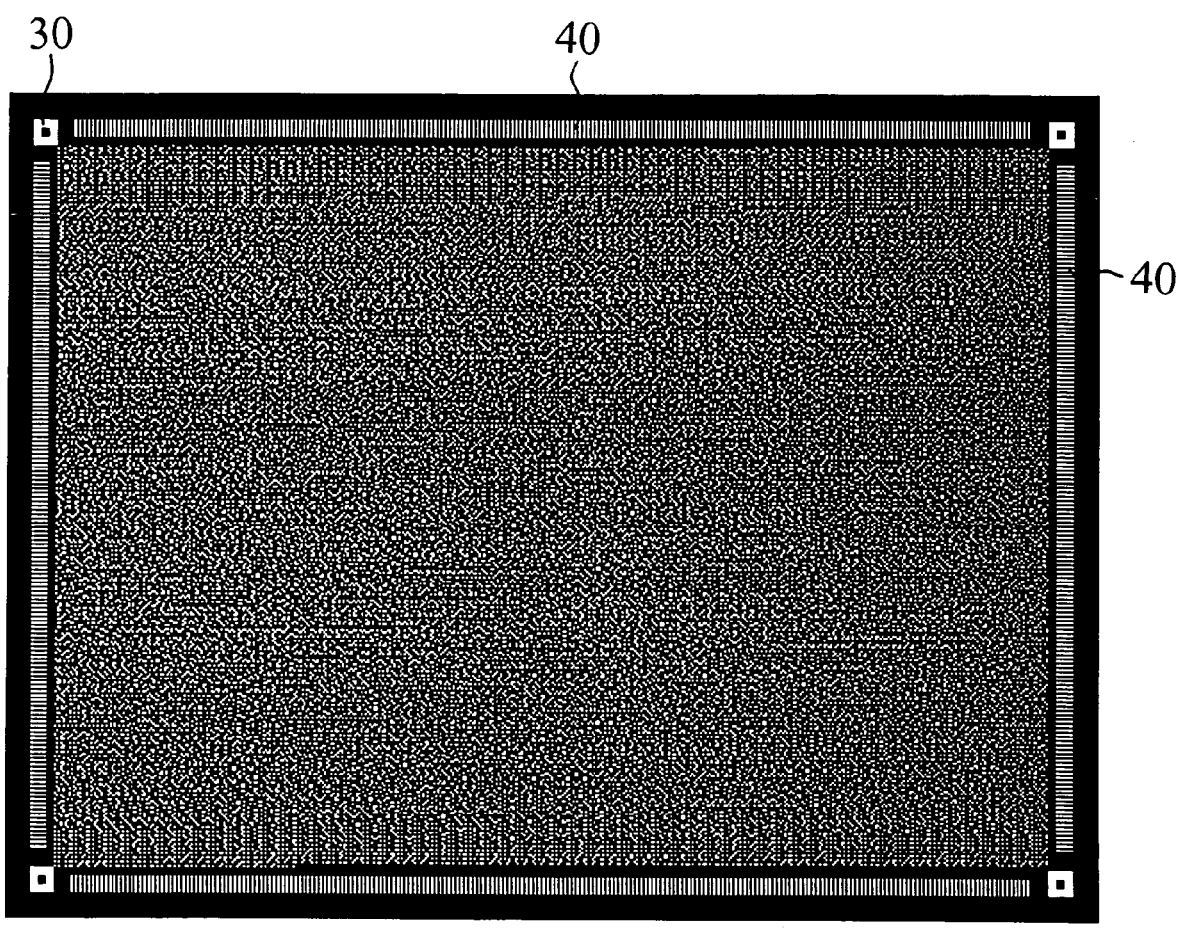
FIG. 6 is a schematic view showing an example of a data page in which markers for automatic positioning displayed on the spatial light modulator shown in FIG. 1 are incorporated.
Figure 7:
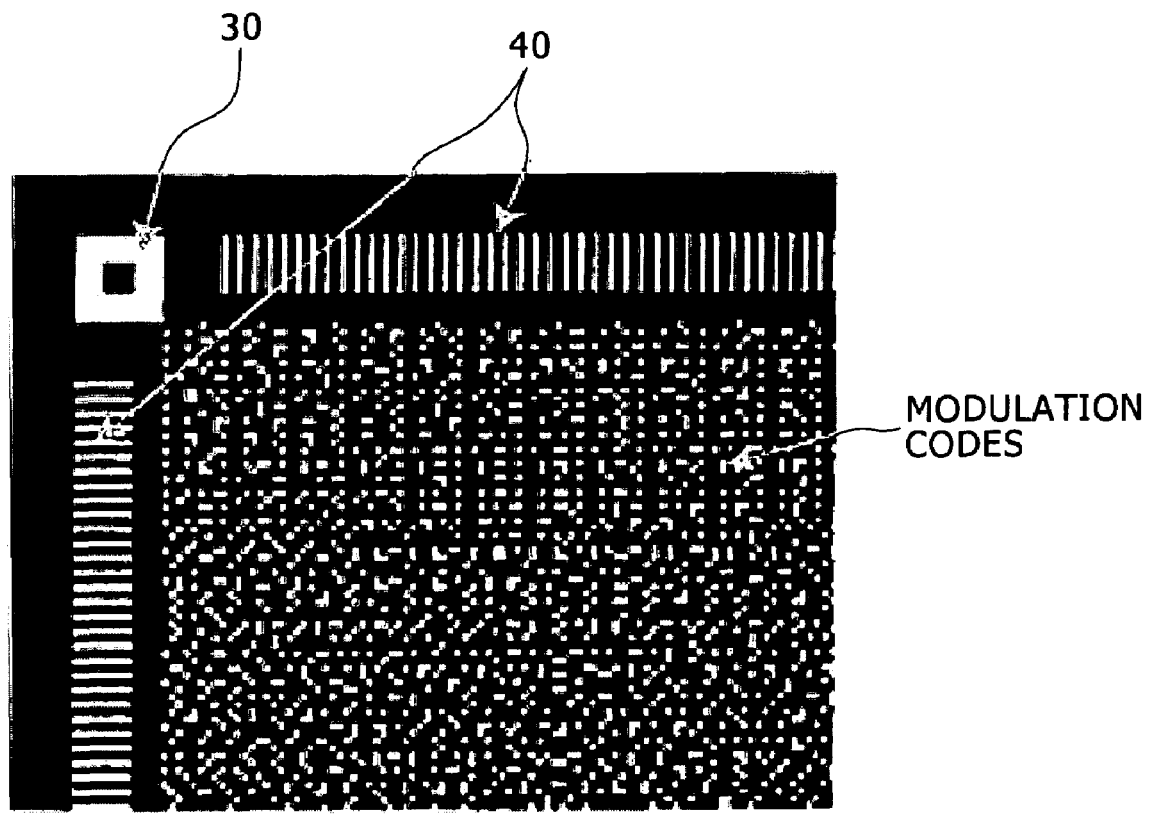
FIG. 7 is an enlarged view of part of the data page shown in FIG. 6.

FIG. 6 shows an example of a data page in which markers for automatic positioning displayed on the spatial light modulator 10 are incorporated and particularly markers for pixel matching are embedded in modulation codes. The image example uses markers having a shape different from that of the marker shown in FIG. 1. In particular, as seen in an enlarged view of FIG. 7, markers 30 for rough positioning are provided at the four corners, and pixel matching markers 40 are disposed in the horizontal and vertical directions between the rough positioning markers 30. Each of the pixel matching markers 40 is formed from an alternate pattern of two values.

Figure 8:
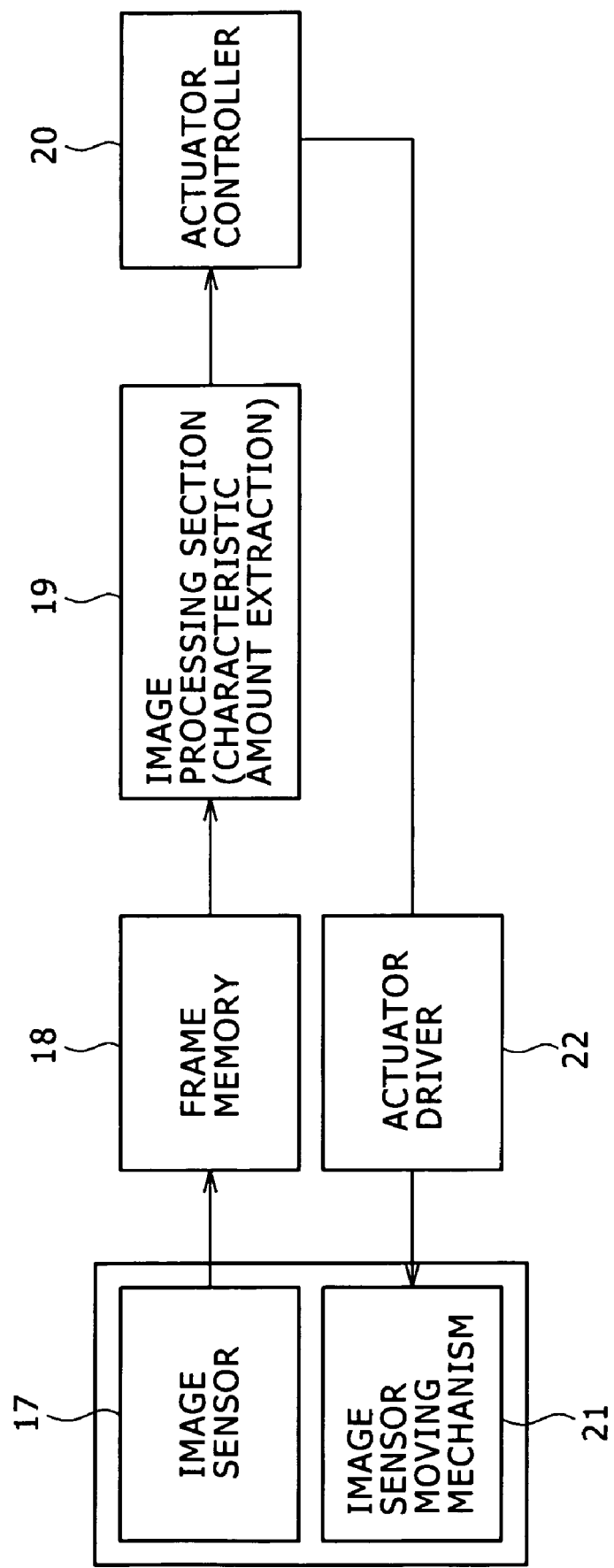
FIG. 8 is a block diagram showing a control system for automatic positioning incorporated in the hologram recording and reproduction apparatus shown in FIG. 1.

FIG. 8 shows a control system for automatic positioning incorporated in the hologram recording and reproduction apparatus shown in FIG. 1. Referring to FIG. 8, the control system shown includes an image sensor moving mechanism 21 for mechanically moving the image sensor 17, a frame memory 18 for storing an image signal outputted from the image sensor 17, and an image processing section 19 for processing an image stored in the frame memory 18. The control system further includes an actuator controller 20 for outputting a control signal based on a result of the processing of the image processing section 19, and an actuator driver 22 for driving the image sensor moving mechanism 21 in accordance with the control signal outputted from the actuator controller 20.

Figure 9:
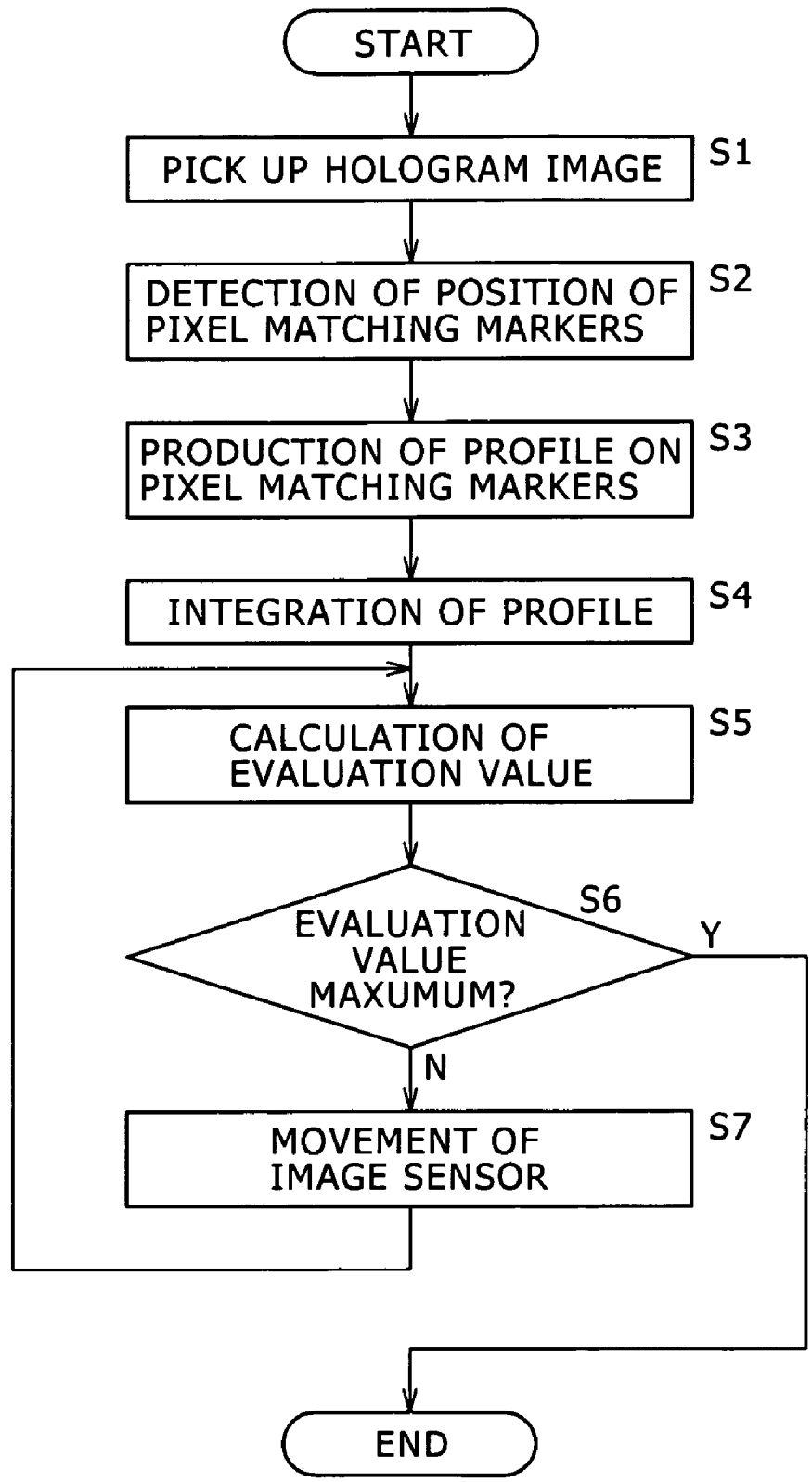
FIG. 9 is a flow chart illustrating an automatic positioning control procedure executed by the control system of FIG. 8.

Now, an automatic positioning control process is described with reference to a flow chart shown in FIG. 9. First, such a data page as shown in FIG. 6 is displayed on the spatial light modulator 10 and recorded into the hologram recording material 60, whereafter it is reproduced so that an image thereof is picked up by the image sensor 17 (step S1).

Figure 10:
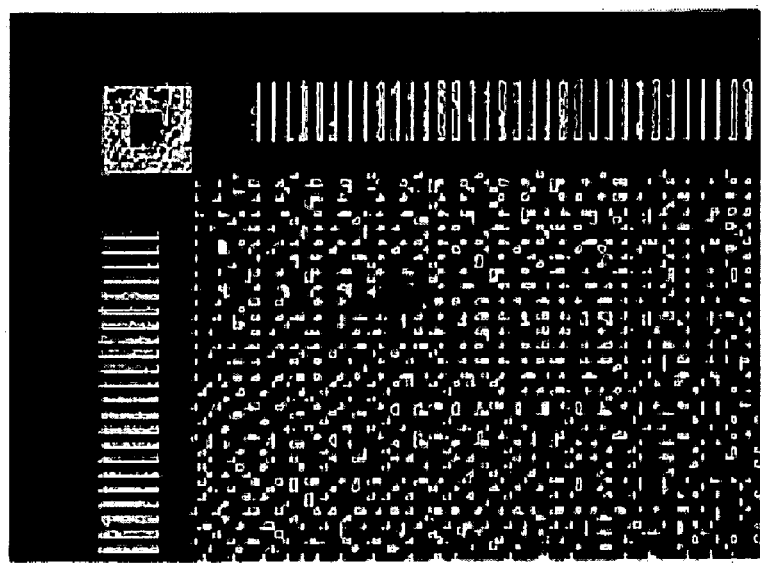
FIG. 10 is a schematic view showing an example of an image picked up by the apparatus shown in FIG. 1 when some positional displacement is involved.
Figure 11:
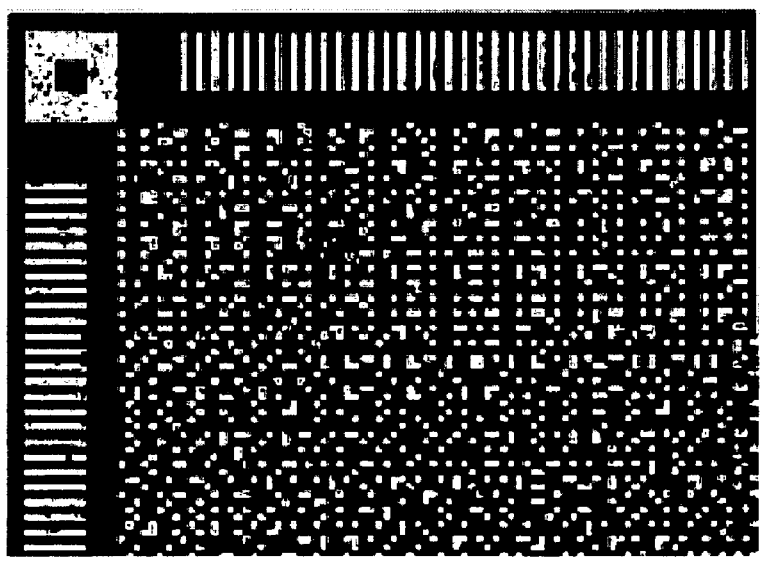
FIG. 11 is a schematic view showing an example of an image picked up by the apparatus shown in FIG. 1 when no positional displacement is involved.
Figure 12:
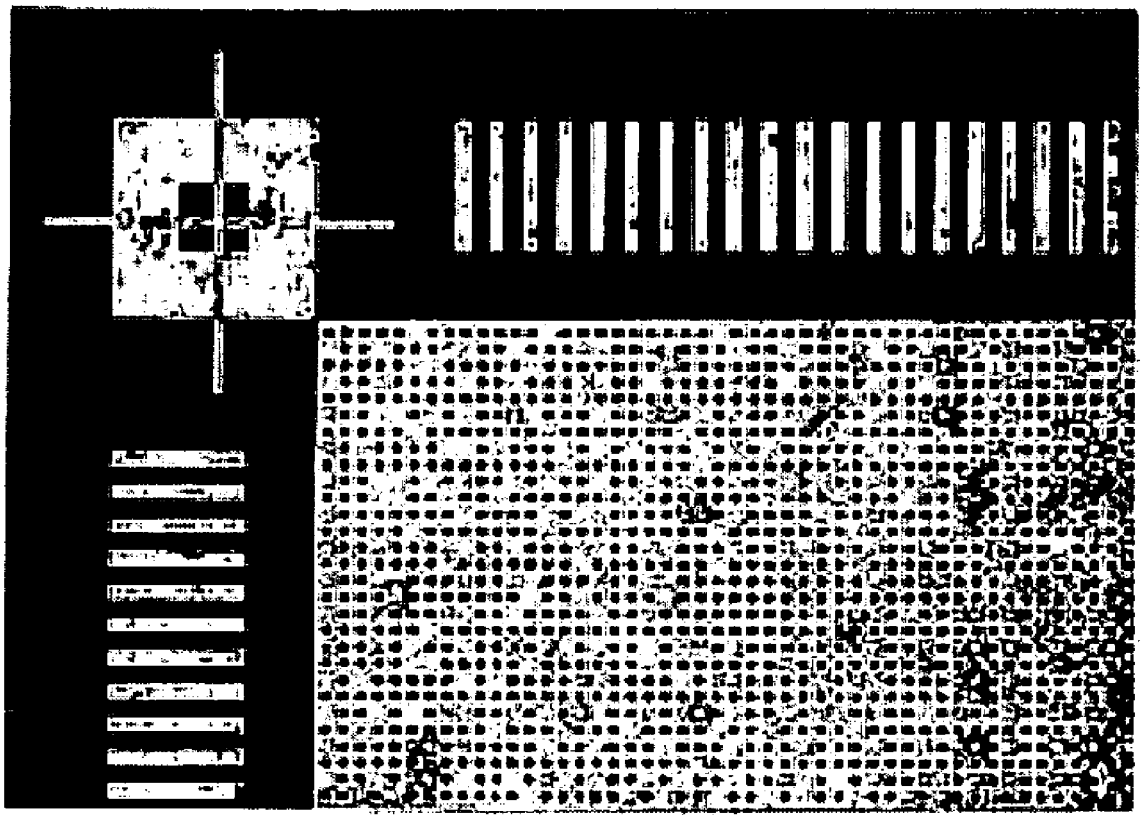
FIG. 12 is a schematic view showing an example of an image when the image shown in FIG. 11 is cut out.

Then, the image processing section 19 automatically recognizes the positioning markers 30 in accordance with an image recognition algorithm therefor to detect the positions of the positioning markers 30 (step S2). Then, the image processing section 19 takes a plurality of line profiles in the horizontal and vertical directions between the markers 30 to produce a plurality of profiles (step S3). Thereafter, the image processing section 19 integrates the profiles (step S4). The image processing section 19 calculates an evaluation value in accordance with the evaluation function given hereinabove using the integrated profile and moves the image sensor 17 in the horizontal and vertical directions so that the evaluation value may have a maximum value (steps S5, S6, and S7). Then, the image processing section 19 fixes the image sensor 17 at the position at which the evaluation value exhibits the maximum value to perform pixel matching. Thereafter, positioning and cutting out of modulation codes, which represent the data, are performed to read out the data while the bit error rate is suppressed low. FIG. 10 shows a picked up image involving some positional displacement while FIG. 11 shows an example of the picked up image whose positional displacement has been corrected by performing pixel matching. FIG. 12 is an enlarged view of part of an image cut out from the image of FIG. 11 by the image sensor 17.

From among the pixel matching markers 40 shown in FIG. 6, those arrayed in the horizontal direction have a width coinciding with the size of the modulation codes, and those arrayed in the vertical direction have a height coinciding with the size of the modulation codes. For example, if the minimum unit of the modulation codes is 2×2 pixels, then the minimum width and the minimum height of the markers are 2 pixels. The alternate patterns of 2 values, which form the markers, are disposed cyclically with the reference width or with the reference height, and can be observed always in the same cycle also on a picked up image if the picked up image does not involve distortion arising from the optical system or the medium.

However, it is difficult to actually suppress distortion arising from an optical system or a medium, and where an image involves some distortion, the cycle of the markers on the image varies depending upon the place. Also in this instance, the distortion of the image can be corrected by positively making use of the variation. Also it is possible to measure the inclination of the markers and correct the inclination of the image.

According to the hologram recording and reproduction apparatus of the present embodiment, a pixel matching image is picked up by the image sensor 17 having a resolution as high as twice that of the spatial light modulator 10 to produce a plurality of line profiles, and an evaluation value is calculated in accordance with an evaluation function from profiles obtained by integrating the line profiles. Then, the image sensor 17 is moved to a position at which the evaluation value exhibits a maximum value to automatically correct any positional displacement between the spatial light modulator 10 and the image sensor 17 on the pixel level. Further, since such pixel matching as described above is performed to cut out the picked up image, a reproduction image signal whose bit error rate can be suppressed low can be obtained.

It is to be noted that the present invention is not limited to the embodiment described above but can be carried out in various modified forms in terms of the particular configuration, function, action, and effect without departing from the subject matter of the present invention. For example, in the embodiment described above, a pixel matching pattern is displayed on the spatial light modulator 10 and an image of signal light optically spatially modulated with the displayed pixel matching pattern is picked up directly by the image sensor 17 to perform positioning between the spatial light modulator 10 and the image sensor 17. However, also if a pixel matching pattern is reproduced from a hologram material in which the pixel matching pattern is recorded in advance and resulting reproduction signal light is received by the image sensor 17, the positional displacement between the spatial light modulator 10 and the image sensor 17 on the pixel level can be corrected automatically. Further, while, in the embodiment described above, the image sensor 17 is moved with respect to the spatial light modulator 10, under certain circumstances, the spatial light modulator 10 may alternatively be moved with respect to the image sensor 17.

Further, while the hologram apparatus of the embodiment described above adopts an angular multiplexing method, similar effects can be achieved also if the present invention is applied to hologram apparatus of any other multiplexing method such as, for example, the shift multiplexing method.

While a preferred embodiment of the present invention has been described using specific terms, such description is for illustrative purpose only, and it is to be understood that changes and variations may be made without departing from the spirit or scope of the following claims.

What is claimed is:

1. A hologram apparatus for recording interference fringes formed from reference light and signal light optically spatially modulated by a spatial light modulator on a hologram recording material or picking up an image of reproduction signal light produced by irradiating illumination reproduction light on the hologram recording material by means of an image pickup device to obtain a reproduction image signal, comprising:

a matching data acquisition section for directly picking up an image of the signal light optically spatially modulated with a pixel matching pattern displayed on said spatial light modulator by means of said image pickup device to obtain a reproduction image signal;

an arithmetic operation section for performing predetermined arithmetic operation using a luminance value of the reproduction image signal; and a positioning control section for moving a relative position between said image pickup device and said spatial light modulator in response to a result of the arithmetic operation of said arithmetic operation section.

2. The hologram apparatus according to claim 1, wherein said positioning control section moves said image pickup device with respect to said spatial light modulator or moves said spatial light modulator with respect to said image pickup device in response to the result of the arithmetic operation of said arithmetic operation section.

3. The hologram apparatus according to claim 1, wherein said image pickup device has a resolution higher than that of said spatial light modulator, and said matching data acquisition section oversamples the signal light optically spatially modulated with the pixel matching pattern.

4. The hologram apparatus according to claim 3, wherein the resolution of said image pickup device is equal to or higher than twice that of said spatial light modulator.

5. The hologram apparatus according to claim 1, wherein said arithmetic operation section calculates a square sum of differences between luminance values of a plurality of successive pixels of said image pickup device and then calculates a sum total of such square sums or calculates a sum total of differences between luminance values of a plurality of successive pixels.

6. The hologram apparatus according to claim 5, wherein said arithmetic operation section calculates the sum total of the square sums and determines the calculated sum total as an evaluation function or calculates the sum total of the differences and determines the calculated sum total as an evaluation function, takes a plurality of line profiles from the reproduction image signal, integrates the profiles, and calculates an evaluation value based on the evaluation function from the integrated profile.

7. The hologram apparatus according to claim 1, wherein said positioning control section moves the mechanical position of said image pickup device to position said image pickup device so that the result of the arithmetic operation of said arithmetic operation section has a maximum value.

8. The hologram apparatus according to claim 1, wherein the pixel matching pattern is formed from an alternate pattern and is displayed in a scattered manner at a plurality of places on a display screen of said spatial light modulator.

9. The hologram apparatus according to claim 1, wherein the pixel matching pattern is formed from an elongated alternate pattern of two values disposed between each adjacent ones of positioning marks disposed at four corners of a display screen of said spatial light modulator.

10. A hologram apparatus for picking up an image of reproduction signal light reproduced by irradiating illumination reproduction light on a hologram recording material by means of an image pickup device to obtain a reproduction image signal, comprising:
    a matching data acquisition section for picking up an image of reproduction signal light obtained by reproduction of a pixel matching pattern recorded in advance in the hologram recording material by means of said image pickup device to obtain a reproduction image signal;
    an arithmetic operation section for performing predetermined arithmetic operation using a luminance value of the reproduction image signal; and
    a positioning control section for moving a relative position between said image pickup device and said spatial light modulator in response to a result of the arithmetic operation of said arithmetic operation section.

11. The hologram apparatus according to claim 10, wherein said positioning control section moves said image pickup device with respect to said spatial light modulator or moves said spatial light modulator with respect to said image pickup device in response to the result of the arithmetic operation of said arithmetic operation section.

12. The hologram apparatus according to claim 10, wherein said image pickup device has a resolution higher than that of said spatial light modulator, and said matching data acquisition section oversamples the signal light optically spatially modulated with the pixel matching pattern.

13. The hologram apparatus according to claim 12, wherein the resolution of said image pickup device is equal to or higher than twice that of said spatial light modulator.

14. The hologram apparatus according to claim 10, wherein said arithmetic operation section calculates a square sum of differences between luminance values of a plurality of successive pixels of said image pickup device and then calculates a sum total of such square sums or calculates a sum total of differences between luminance values of a plurality of successive pixels.

15. The hologram apparatus according to claim 14, wherein said arithmetic operation section calculates the sum total of the square sums and determines the calculated sum total as an evaluation function or calculates the sum total of the differences and determines the calculated sum total as an evaluation function, takes a plurality of line profiles from the reproduction image signal, integrates the profiles, and calculates an evaluation value based on the evaluation function from the integrated profile.

16. The hologram apparatus according to claim 10, wherein said positioning control section moves the mechanical position of said image pickup device to position said image pickup device so that the result of the arithmetic operation of said arithmetic operation section has a maximum value.

17. The hologram apparatus according to claim 10, wherein the pixel matching pattern is formed from an alternate pattern and is displayed in a scattered manner at a plurality of places on a display screen of said spatial light modulator.

18. The hologram apparatus according to claim 10, wherein the pixel matching pattern is formed from an elongated alternate pattern of two values disposed between each adjacent ones of positioning marks disposed at four corners of a display screen of said spatial light modulator.

19. A positioning method for a spatial light modulator and an image pickup device in a hologram apparatus which records interference fringes formed from reference light and signal light optically spatially modulated by said spatial light modulator or picks up an image of reproduction signal light produced by irradiating illumination reproduction light on the hologram recording material by means of said image pickup device to obtain a reproduction image signal, comprising the steps of:
    displaying a pixel matching pattern on said spatial light modulator;
    directly picking up an image of the signal light optically spatially modulated with the pixel matching pattern displayed on said spatial light modulator by means of said image pickup device to obtain a reproduction image signal;
    performing predetermined arithmetic operation using a luminance value of the reproduction image signal; and
    moving a relative position between said image pickup device and said spatial light modulator in response to a result of the arithmetic operation.

20. A positioning method for a spatial light modulator and an image pickup device in a hologram apparatus which picks up an image of reproduction signal light reproduced by irradiating illumination reproduction light on a hologram recording material by means of an image pickup device to obtain a reproduction image signal, comprising the steps of:
    reproducing a pixel matching pattern recorded in advance in the hologram recording material to obtain reproduction signal light;
    picking up an image of the reproduction signal light by means of the image pickup device to obtain a reproduction image signal;
    performing predetermined arithmetic operation using a luminance value of the reproduction image signal; and
    moving a relative position between said image pickup device and said spatial light modulator in response to a result of the arithmetic operation.

21. An article of manufacture for having a hologram recorded therein, comprising:
    a hologram recording material having recorded therein interference fringes formed from reference light and signal light optically spatially modulated by a spatial light modulator, said hologram recording material having recorded therein a pattern that provides means for correction of positional displacement on a pixel level between said spatial light modulator and an image pickup device for picking up a reproduction image when recorded data of said hologram recording material is reproduced.

* * * * *